(12) United States Patent
Kojima et al.

(10) Patent No.: US 7,651,165 B2
(45) Date of Patent: Jan. 26, 2010

(54) SEAT RECLINING APPARATUS FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 10 days.

(21) Appl. No.: 12/018,624

(22) Filed: Jan. 23, 2008

(65) Prior Publication Data
US 2008/0174163 A1    Jul. 24, 2008

(30) Foreign Application Priority Data
Jan. 24, 2007    (JP)    ............................. 2007-013977

(51) Int. Cl.
*B60N 2/235* (2006.01)

(52) U.S. Cl. .................................................... 297/367

(58) Field of Classification Search .................. 297/367
See application file for complete search history.

(56) References Cited

U.S. PATENT DOCUMENTS 6,854,802 B2 *    2/2005    Matsuura et al. ........ 297/367 X

FOREIGN PATENT DOCUMENTS

| EP | 1 405 756 A2 | 4/2004 |
| EP | 1 591 303 A2 | 11/2005 |
| JP | 2004-105360 | 4/2004 |
| WO | WO 2006/016750 A1 | 2/2006 |

* cited by examiner

*Primary Examiner*—Anthony D Barfield
(74) *Attorney, Agent, or Firm*—Oblon, Spivak, McClelland, Maier & Neustadt, L.L.P.

(57) ABSTRACT

A seat reclining apparatus for a vehicle includes: a first plate adapted to be mounted on one of a seat cushion and a seat back and having inner teeth; a second plate adapted to be mounted on the other one of the seat cushion and the seat back and supporting the first plate to be rotatable; a pole directly and movably supported by the second plate and having outer teeth engageable and disengageable with the inner teeth of the first plate; a pair of guides formed at the second plate and interposing therebetween the pole from both sides, the guide including a pole sliding surface adjusted to slidably come in contact with a side surface of the pole; and a recess formed at the pole sliding surface of the guide.

13 Claims, 4 Drawing Sheets

SEAT RECLINING APPARATUS FOR VEHICLE

CROSS REFERENCE TO RELATED APPLICATIONS

This application is based on and claims priority under 35 U.S.C. §119 to Japanese Patent Application 2007-013977, filed on Jan. 24, 2007, the entire content of which is incorporated herein by reference.

FIELD OF THE INVENTION

The present invention relates to a seat reclining apparatus for a vehicle.

BACKGROUND

JP2004-105360A discloses therein a conventional seat reclining apparatus for a vehicle, which inclines a seat back relative to a seat cushion. The seat reclining apparatus includes a ratchet having inner teeth, and a base arm attached with multiple poles to be movable in a radial direction. The ratchet is prohibited from rotating relative to the base arm with the inner teeth of the ratchet being engaged with outer teeth of the poles in response to the rotation of a cam provided around a rotational shaft, and the ratchet is allowed to rotate relative to the base arm with the inner teeth of the ratchet being disengaged from the outer teeth of the poles in response to the rotation of a cam provided around a rotational shaft. Accordingly, the pivotal rotation of the seat back relative to the seat cushion is prohibited and allowed, thereby adjusting or maintaining an inclining angle of the seat back at a required inclining angle appropriate to support an occupant seated on the seat cushion.

Each pole is guided to move in the radial direction with both side surfaces of the pole being slided on a pair of guides formed at the base arm. In JP2004-105360A, a surface of each guide, which faces the ratchet, is applied with a blanking process in a plate-thickness direction and is formed with multiple pole sliding surfaces in the plate-thickness direction. That is, JP2004-105360A suggests each guide having the multiple pole sliding surfaces formed in a stepped manner. In this case, the blanking or stamping amount of each pole sliding surface is reduced, so that the thickness of the connected portion of each pole sliding surface is increased compared with a conventional structure. Therefore, it is possible to enhance shear strength of each guide (connected portion) against a load applied from the corresponding pole while maintaining a conventional plate-thickness of the base arm.

Meanwhile, as described above, because the shear strength of each guide against the load applied from the corresponding pole is increased, the pole is supported by the guide more firmly in response to the increment of the shear strength. Therefore, for example when the seat back is exposed to impact, a sufficient amount of impact energy is not absorbed and an excessive amount of load may be applied to engagement portions of the inner teeth of the ratchet and the outer teeth of the pole. In this case, there is a possibility that the engagement may become unstable and the seat back may not be maintained at the required inclining angle stably.

A need thus exists for a seat reclining apparatus for a vehicle, which is not susceptible to the drawback mentioned above.

SUMMARY OF THE INVENTION

According to an aspect of the present invention, a seat reclining apparatus for a vehicle includes: a first plate adapted to be mounted on one of a seat cushion and a seat back and having inner teeth; a second plate adapted to be mounted on the other one of the seat cushion and the seat back and supporting the first plate to be rotatable; a pole directly and movably supported by the second plate and having outer teeth engageable and disengageable with the inner teeth of the first plate; a pair of guides formed at the second plate and interposing therebetween the pole from both sides, the guide including a pole sliding surface adjusted to slidably come in contact with a side surface of the pole; and a recess formed at the pole sliding surface of the guide.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
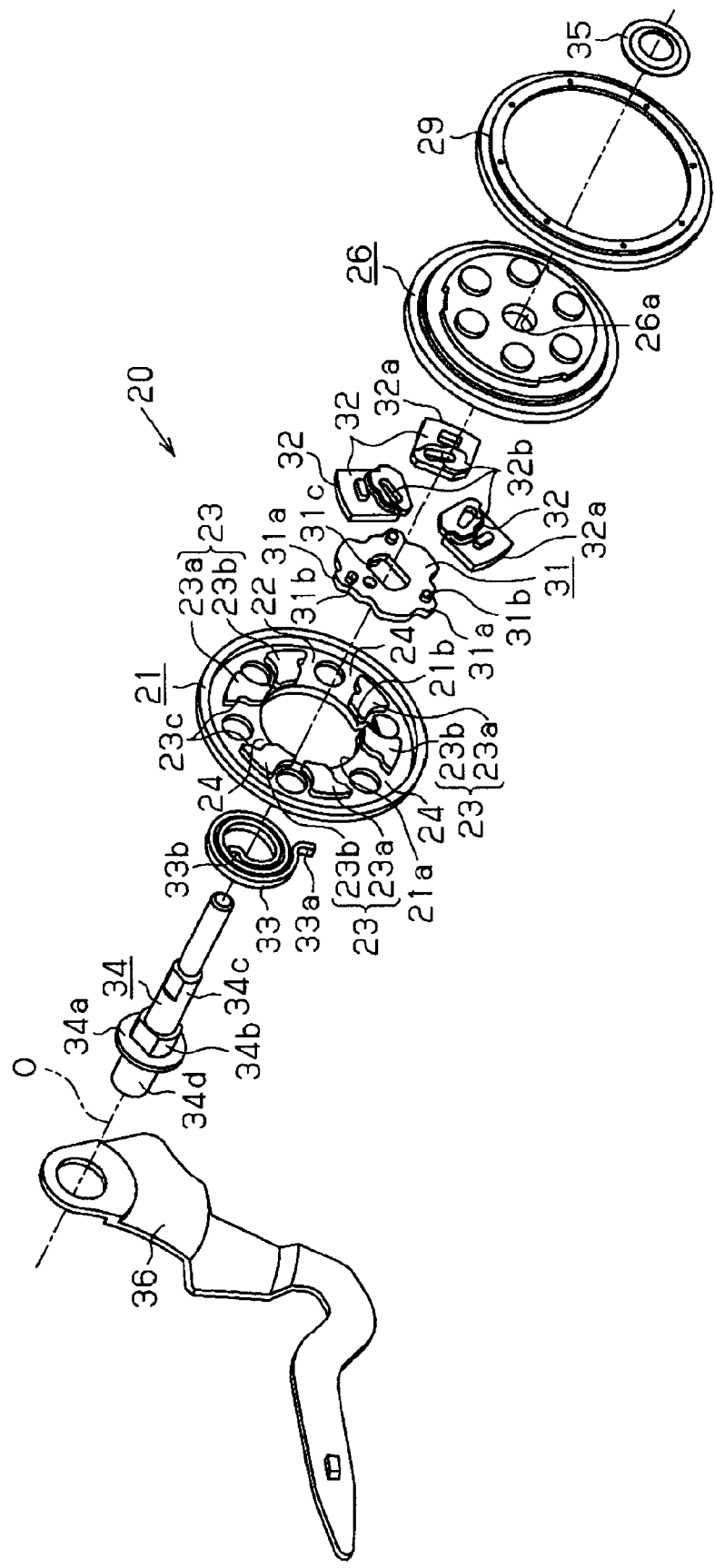
FIG. 1 is an exploded perspective view illustrating a seat reclining apparatus according to an embodiment of the present invention.
Figure 2:
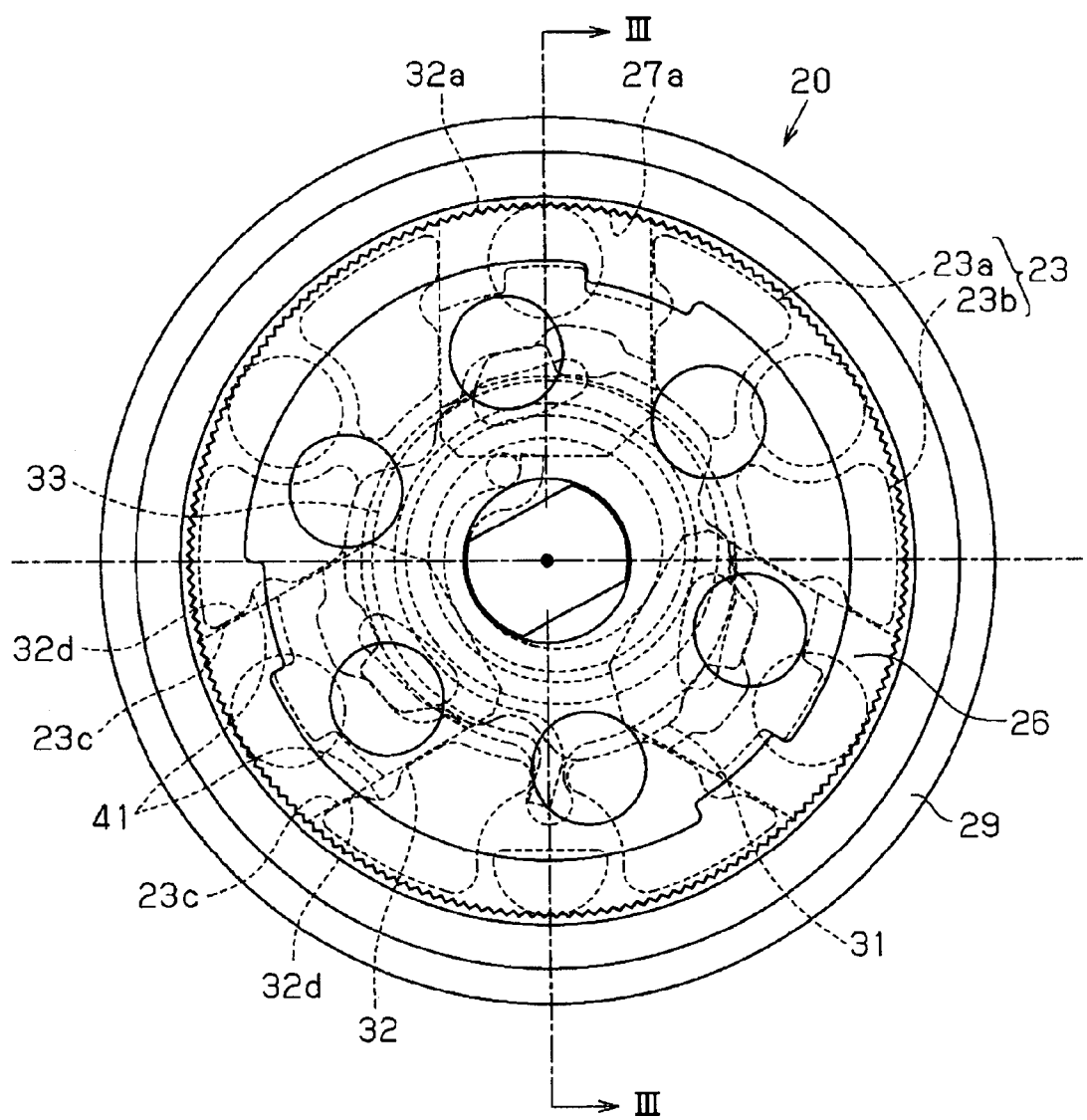
FIG. 2 is a front view illustrating the seat reclining apparatus.
Figure 3:
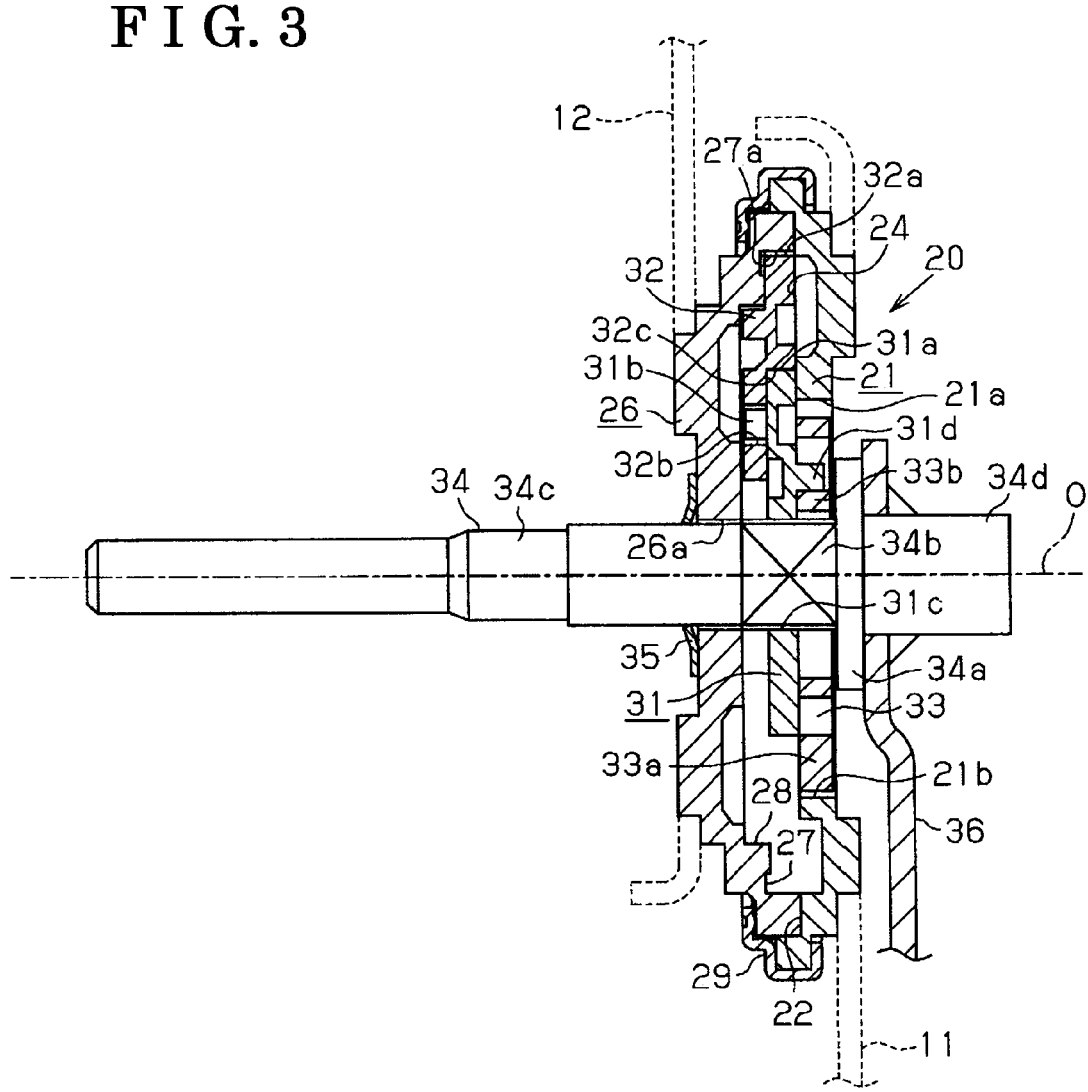
FIG. 3 is a sectional view taken along line III-III in FIG. 2.

Described below is an embodiment of the present invention with reference to the attached drawings. FIG. 1 is an exploded perspective view illustrating a seat reclining apparatus for a vehicle such as an automobile. FIG. 2 is a front view illustrating the seat reclining apparatus. FIG. 3 is a sectional view taken along line III-III in FIG. 2. The seat reclining apparatus for the vehicle fundamentally includes a structure illustrated in FIGS. 1, 2 and 3 at the left and right sides in the seat lateral direction respectively. According to the embodiment, the structure arranged at the right side towards the front of the vehicle is illustrated. Therefore, the structure arranged at the right side is described below and the structure at the left side is not described below in order to simplify the description. However, the following description is also applied to the structure at the left side.

As illustrated in FIG. 3, the seat reclining apparatus includes a seat cushion frame 11 that is made from a metal plate and serves as a framework of a seat cushion. A seat back frame 12, which is also made from a metal plate and serves as a framework of a seat back, is connected to the seat cushion frame 11 so as to pivotably rotate or incline relative to the seat cushion about a rotational axis O via a lock mechanism 20. The lock mechanism 20 is adjusted to selectively prohibit and allow a rotation of the seat back frame 12 relative to the seat cushion frame 11. The lock mechanism 20 is employed fundamentally to maintain the seat back frame 12 in a rotation prohibiting state relative to the seat cushion frame 11. Therefore, the seat back is maintained at an appropriate inclining angle relative to the seat cushion.

Described below is the lock mechanism 20. As illustrated in FIG. 3, a lower plate 21 (serving as a second plate) is firmly welded to an inner side surface of the seat cushion frame 11 and is formed by half-blanking a metal plate. As illustrated in FIG. 1, the lower plate 21 is formed into a ring-shaped structure having a through hole 21a at a center thereof. The lower plate 21 is formed with an engagement hole 21b that is formed continuously with the through hole 21a and is recessed radially outwardly.

The lower plate 21 is further formed with a recess 22 at an opposite side to the seat cushion frame 11, a recess 22 exhibiting a round shape recessed towards the seat cushion frame 11. The recess 22 includes plural protrusions 23 that are arranged in a predetermined angle and protrude from a bottom wall of the recess 22. According to the embodiment, the recess 22 is formed with the three protrusions 23. Each protrusion 23 includes two guides 23a and 23b which are separated from each other in a circumferential direction. Each guide 23a and 23b of the protrusion 23 is formed with a pole sliding surface 23c extending in parallel to the pole sliding surface 23c of the adjacent protrusion 23. The pole sliding surface 23c extends radially in a planar manner. The lower plate 21 is still further formed with guiding grooves 24 which are respectively arranged between the pole sliding surfaces 23c of the adjacent protrusions 23 and extend in the radial direction.

As illustrated in FIGS. 1 and 3, an upper plate 26 (serving as a first plate) is firmly welded to an inner side surface of the seat back frame 12. The upper plate 26 is formed by half-blanking a metal plate and exhibits a ring-shaped structure having an outer diameter substantially identical to an inner diameter of the recess 22 of the lower plate 21 and a shaft insertion hole 26a at the center thereof. The upper plate 26 is mounted to the lower plate 21 so that an outer peripheral surface of the upper plate 26 slidably comes in contact with an inner peripheral surface of the recess 22 of the lower plate 21. In other words, the upper plate 26 is pivotally supported by the lower plate 21 so that the upper plate 26 is rotated relative to the lower plate 21. Therefore, the seat back frame 12 is linked to the seat cushion frame 11 via the lower plate 21 and the upper plate 26 (the lock mechanism 20) so that the seat back frame 12 is rotatable relative to the seat cushion frame 11.

As illustrated in FIG. 3, the upper plate 26 is formed with a first recess 27 at an opposite side to the seat back frame 12 (at the side of the lower plate 21), a first recess 27 exhibiting a round shape recessed towards the seat back frame 12. The first recess 27 is formed with inner teeth 27a at its inner peripheral surface. The inner teeth 27a face the guiding grooves 24 in the radial direction where the upper plate 26 is mounted to the lower plate 21. The first recess 27 is further formed with a second recess 28, which has an inner diameter smaller than the inner diameter of the first recess 27 and exhibits a round shape. The second recess 28 is recessed further towards the seat back frame 12 than the first recess 27 is and is arranged coaxially with the first recess 27.

A ring-shaped holder 29, which is made from a metal plate, is fitted with an outer circumferential portion of the upper plate 26 and the lower plate 21 integrated where the upper plate 26 is mounted to the lower plate 21. The holder 29, which is mounted on the lower plate 21 and the upper plate 26, prevents the lower plate 21 and the upper plate 26 from dropping in the axial direction while allowing the relative rotation of the lower plate 21 and the upper plate 26.

A cam 31, which is formed by half-blanking a metal plate, is accommodated in an internal space defined by the recess 22, the first recess 27 and the second recess 28 where the upper plate 26 is mounted to the lower plate 21. The cam 31 is accommodated to be rotatable about the rotational axis O. As illustrated in FIG. 1, the cam 31 includes multiple cam portions 31a extending in the radial direction and arranged in a predetermined angle. According to the embodiment, the cam 31 includes the three cam portions 31a. Moreover, each cam portion 31a is formed with a pin-shaped protrusion 31b protruding towards the upper plate 26 in parallel to the axial direction. The cam 31 is formed with a fitting hole 31c penetrating its central portion in the axial direction and exhibiting an approximately circular and flattened cross section (like an oval shape). Going back to FIG. 3, the cam 31 is further formed with a pin-shaped protrusion 31d protruding in parallel to the axial direction and towards the lower plate 21.

As illustrated in FIG. 1, the pole 32 is arranged at the corresponding guiding groove 24 of the lower plate 21, the pole 32 being formed into an approximately rectangular-shaped plate having a circumferential directional length smaller than the one of the guiding groove 24. Each pole 32 has side surfaces 32d (see FIG. 2) that slidably come in contact with the pole sliding surfaces 23c of the protrusions 23, so that the pole 32 is guided to move in the radial direction. That is, each pole 32 is guided to move in the radial direction while being interposed from both sides in the circumferential direction by the guide 23a of the corresponding protrusion 23 and the guide 23b of the adjacent protrusion 23. Further, each pole 32 is formed, at its distal end, with outer teeth 32a engageable with the inner teeth 27a (see FIG. 3) of the upper plate 26 and is formed, at its base end, with a cam hole 32b penetrating in a thickness direction. The cam hole 32b is arranged in an inclined manner relative to the circumferential direction having the rotational axis O as the center. The pole 32 is engaged with the cam 31 when the protrusion 31b of the cam 31 is engaged with the cam hole 32b.

As further illustrated in FIG. 3, each pole 32 is provided with an axially-stepped portion between the outer teeth 32a and the cam hole 32b. An end surface of this axially-stepped portion faces in the radial direction and is formed with a pole cam surface 32c. The pole cam surface 32c extends so as to come across the side surfaces 32d of the pole 32 and to be inclined relative to a pitch circle of the outer teeth 32a. The pole 32 is engaged with the cam 31 when the distal surface of the cam portion 31a is in contact with the pole cam surface 32c.

That is, when the cam 31 rotates to one side (clockwise in FIG. 1) in a situation where the cam 31 and the poles 32 are accommodated between the lower plate 21 and the upper plate 26 (inner space), the poles 32 are moved so as retract in the radial direction along the guiding grooves 24 as a result of that the cam holes 32b of the poles 32 are pushed by the protrusions 31b of the cam 31. In this case, the upper plate 26 is allowed to rotate relative to the lower plate 21 when the outer teeth 32a of the poles 32 are disengaged from the inner teeth 27a of the upper plate 26. As a result, a rotation allowing state is established, in which the upper plate 26 is allowed to rotate relative to the lower plate 21.

On the other hand, when the cam 31 rotates to the other side (counterclockwise in FIG. 1), the poles 32 are moved so as to move radially outwardly along the guiding grooves 24 as a result of that the cam holes 32b of the poles 32 are pushed by the protrusions 31b of the cam 31 and that the pole cam surfaces 32c are pushed by a distal surface of the cam portions 31a. In this case, the outer teeth 32a of the poles 32 are engaged with the inner teeth 27a of the upper plate 26, so that the upper plate 26 is prohibited from rotating relative to the lower plate 21. As a result, a rotation prohibiting state is established, in which the upper plate 26 is prohibited from rotating relative to the lower plate 21.

The seat reclining apparatus according to the embodiment of the present invention further includes a spring 33 formed by spirally winding a wire. The spring 33 is accommodated at the central portion of the lower plate 21, i.e., at an inner side of the through hole 21a. One end 33a of the spring 33 is engaged at the engagement hole 21b of the lower plate 21 and the other end 33b thereof is engaged with the protrusion 31d (see FIG. 3) of the cam 31. This spring 33 biases the cam 31 to the other side (counterclockwise in FIG. 1) so that the cam 31 rotates relative to the lower plate 21, i.e., so that the rotation prohibiting state is established, in which the upper plate 26 is prohibited from rotating relative to the lower plate 21.

Therefore, by use of the biasing force of the spring 33, the cam 31 basically maintains the rotation prohibiting state in which the upper plate 26 is prohibited from rotating relative to the lower plate 21 and maintains the rotation prohibiting state in which the seat back frame 12 is prohibited from rotating relative to the seat cushion frame 11. Further, when the cam 31 rotates clockwise in FIG. 1 against the biasing force of the spring 33, the rotation prohibiting state is shifted to the rotation allowing state in which the upper plate 26 is allowed to rotate relative to the lower plate 21.

A connecting shaft 34, which is made from a metal bar, is inserted sequentially into the through hole 21a of the lower plate 21 housing the spring 33, the fitting hole 31c of the cam 31 and the shaft insertion hole 26a of the upper plate 26. The connecting shaft 34 includes integrally a flange 34a extending outwardly, an approximately circular and flattened cross section (like an oval shape) fitting portion 34b, which protrudes to one axial side (towards the lower plate 21) at the flange 34a and is fitted into the fitting hole 31c, and a connecting portion 34c, which is continuous with the fitting portion 34b and protrudes to the further axial side (towards the lower plate 21). The connecting shaft 34 is fittedly mounted with an annular-shaped bush nut 35 at an end portion of the connecting shaft 34, an end portion protruding out of the shaft insertion hole 26a. Therefore, the connecting shaft 34 is positioned in the axial direction between the bush nut 35 and the flange 34a adjacent to the spring 33. Here, the fitting portion 34b is positioned in the axial direction so as to fit into the fitting hole 31c (see FIG. 3) and is connected to the cam 31 so as to rotate integrally therewith.

Further, the connecting portion 34c of the connecting shaft 34 illustrated in FIG. 1 is connected to a corresponding connecting portion 34c (not illustrated) of the other connecting shaft 34 (not illustrated) forming a pair with the connecting shaft 34 in FIG. 1. The connecting shaft 34 in FIG. 1 is hence rotatable integrally with the other connecting shaft 34 (not illustrated). Therefore, because the connecting shafts 34 at both sides are operatively associated with each other and rotate, the cams 31 at both sides are rotated integrally via the fitting portions 34b of the connecting shafts 34 fitted into the fitting bores 31c.

The connecting shaft 34 further includes an attachment portion 34d protruding at the flange 34a in the other axial side (to the opposite side to the lower plate 21). The connecting shaft 34 illustrated in FIG. 1 is attached with an operation lever 36 that is inserted with the attachment portion 34d and is operatively associated with the connecting shaft 34. Therefore, the operation lever 36 is rotatable integrally with the connecting shaft 34 illustrated in FIG. 1. The operation lever 36 is employed to input an operation force to the cams 31 via the connecting shaft 34. The operation force serves to rotate the cams 31 clockwise in FIG. 1 relative to the lower plate 21 against the spring 33, i.e., to switch the state of the upper plate 26 relative to the lower plate 21 to the rotation allowing state.

Figure 4:
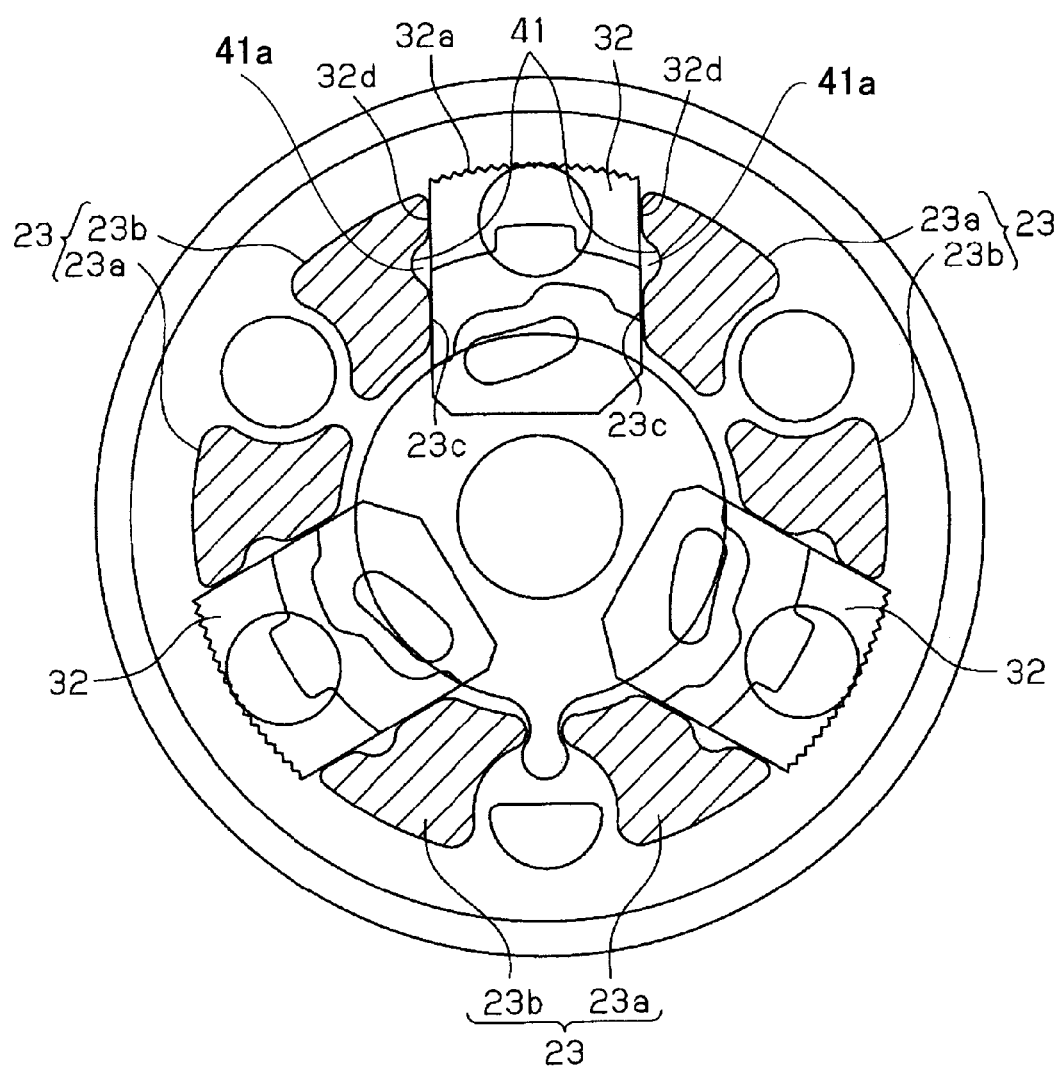
FIG. 4 is a front view simply illustrating the seat reclining apparatus.

Described below are the guides 23a, 23b and the poles 32 according to the embodiment. As being simply illustrated in FIG. 4, each side surface 32d of each pole 32 is formed to be flat (planar) along the moving direction of the pole 32. The pole sliding surface 23c of each guide 23a (23b) is formed with a recess 41 so that a part of the pole sliding surface 23c is separated away in the circumferential direction from the corresponding side surface 32d of the pole 32. The recess 41 defines a space 41a relative to the corresponding circumferential side surface 32d of the pole 32. For example when an excessive amount of load is applied from the pole 32, deformation (plastic deformation) of the guide 23a (23b) starts at the recess 41.

As described above, the following effects are obtained according to the embodiment.

The pole sliding surface 23c includes the recess 41. Therefore, for example when an excessive amount of load is transmitted through the pole 32, the deformation (plastic deformation) of the guide 23a (23b) is encouraged by the recess 41 formed at the guide 23a (23b). Therefore, even when an impact is applied to the seat back, compression of the pole sliding surface 23c of the protrusion 23 is started at the recess 41 and the compressed pole sliding surface 23c absorbs energy of the impact. It is hence possible to reduce a load (peak load) to be applied to an engagement portion between the inner teeth 27a of the upper plate 26 and the outer teeth 32a of the pole 32. As a result, it is possible to maintain the engagement, i.e., to maintain the inclining angle of the seat back in a more stable manner. Further, it is possible to appropriately adjust characteristics of energy absorbing in response to a condition of input load by modifying the shape, the quantity, or the like of the recess 41 formed at the pole sliding surface 23c.

The embodiment of the present invention can be modified as follows.

The shape of the recess 41 can be formed into any shape, such as an arc shape, a triangular shape, and a rectangular shape, as far as impact energy is absorbed appropriately. Further, each pole sliding surface 23c may be provided with plural recesses 41.

According to the embodiment, the poles 32 are moved in the radial direction, so that the inclining angle of the seat back relative to the seat cushion is maintained or adjusted. However, the movement direction of the poles 32 is not limited to the radial direction.

The quantity of the poles 32 engageable with the cam 31 may be two or less than that or may be four or more than that.

According to the embodiment, the seat cushion frame 11 and the lower plate 21 are separate mechanical components. However, the scope of the present invention can be retained even when the seat cushion frame 11 and the lower plate 21 are formed integrally.

According to the embodiment, the lower plate 21 is supported by the seat cushion and the upper plate 26 is supported by the seat back. However, the upper plate 26 may be supported by the seat cushion and the lower plate 21 may be supported by the seat back.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat reclining apparatus for a vehicle, comprising:
   a first plate mounted on one of a seat cushion and a seat back and including inner teeth;
   a second plate mounted on the other one of the seat cushion and the seat back and supports the first plate to be rotatable;
   a pole directly and movably supported by the second plate and including outer teeth engageable and disengageable with the inner teeth of the first plate; and
   a first guide disposed at the second plate, the first guide including a side surface comprising a first pole sliding surface, a second pole sliding surface and a recess,
   wherein the first pole sliding surface and the second pole sliding surface are adjusted to slidably come in contact with a first flat side surface of the pole, the second pole sliding surface is disposed at a radially outer side of the first pole sliding surface relative to a rotational axis of the first and second plates, and the recess is disposed between the first pole sliding surface and the second pole sliding surface.

2. A seat reclining apparatus for a vehicle according to claim 1, wherein the recess defines a space relative to the side surface of the pole.

3. A seat reclining apparatus for a vehicle according to claim 1, wherein the recess allows a part of the pole sliding surface to be separated away from the side surface of the pole in a circumferential direction.

4. A seat reclining apparatus for a vehicle according to claim 1, wherein the guides are formed by applying a blanking process to the second plate in a plate-thickness direction.

5. A seat reclining apparatus for a vehicle according to claim 1, further comprising a second guide disposed at the second plate that includes a side surface comprising a first pole sliding surface, a second pole sliding surface, and a recess,
   the first pole sliding surface of the second guide and the second pole sliding surface of the second guide are adjusted to slidably come in contact with a second side surface of the pole, the second pole sliding surface of the second guide is disposed at a radially outer side of the first pole sliding surface of the second guide relative to the rotational axis of the first and second plates, and the recess disposed between the first pole sliding surface and the second pole sliding surface of the second guide.

6. A seat reclining apparatus for a vehicle according to claim 1, wherein the recess facilitates a deformation of the guide when a large force is applied to the guide.

7. A seat reclining apparatus for a vehicle according to claim 1, wherein the pole slides in a radial direction relative to the rotational axis of the first and second plates.

8. A seat reclining apparatus for a vehicle according to claim 7, wherein the side surface of the pole and the side surface of the guide that faces the side surface of the pole are formed in parallel with each other in the radial direction.

9. A seat reclining apparatus for a vehicle according to claim 1, wherein the second plate includes the first guide and a second guide each guide including the side surface, and the pole includes two side surfaces facing the side surfaces of the first and second guides respectively where the recesses are disposed.

10. A seat reclining apparatus for a vehicle according to claim 9, wherein the recesses open towards the side surfaces of the pole respectively when the outer teeth of the pole engages with the inner teeth of the first plate.

11. A seat reclining apparatus for a vehicle according to claim 1, wherein the first pole sliding surface is disposed at a radially outer end portion relative to the rotational axis of the first and second plates.

12. A seat reclining apparatus for a vehicle according to claim 1, wherein the second pole sliding surface is disposed at a radially inner end portion relative to the rotational axis of the first and second plates.

13. A seat reclining apparatus for a vehicle according to claim 1, wherein the pole includes a hole arranged in an inclined manner relative to a circumferential direction, and a protrusion on a cam engages the hole.

* * * * *